Jan. 19, 1932.   B. W. KING   1,842,029
SCALE CONSTRUCTION
Filed June 13, 1929   2 Sheets-Sheet 1
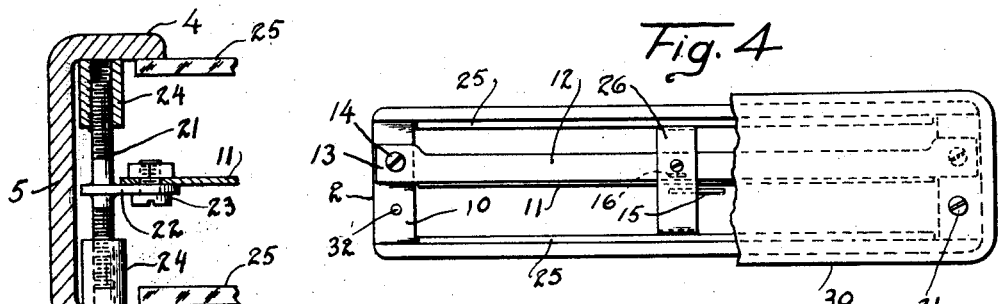
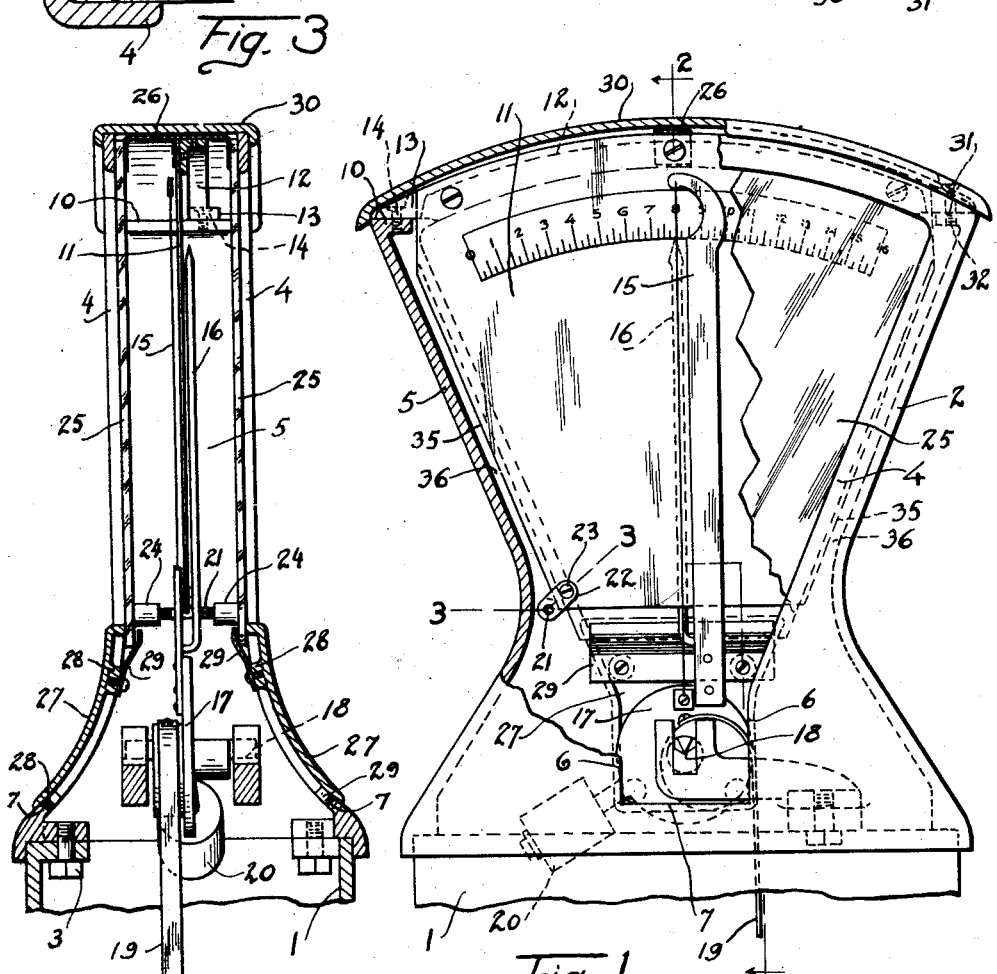
INVENTOR.
Bert W. King
BY
ATTORNEY.

Jan. 19, 1932.  B. W. KING  1,842,029
SCALE CONSTRUCTION
Filed June 13, 1929  2 Sheets-Sheet 2
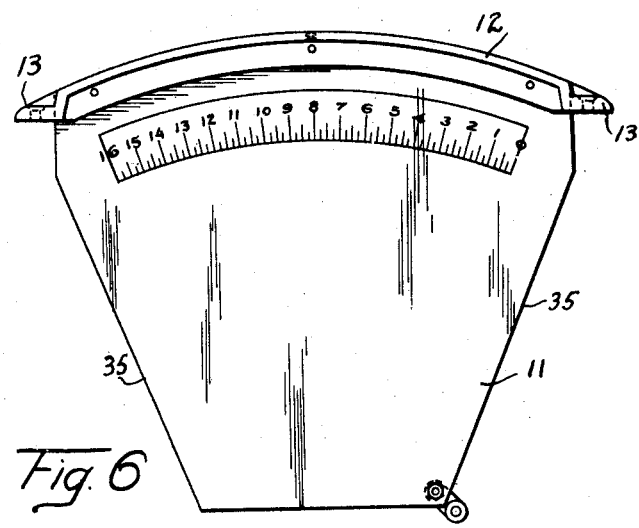
Fig. 6
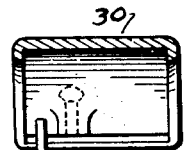
Fig. 5
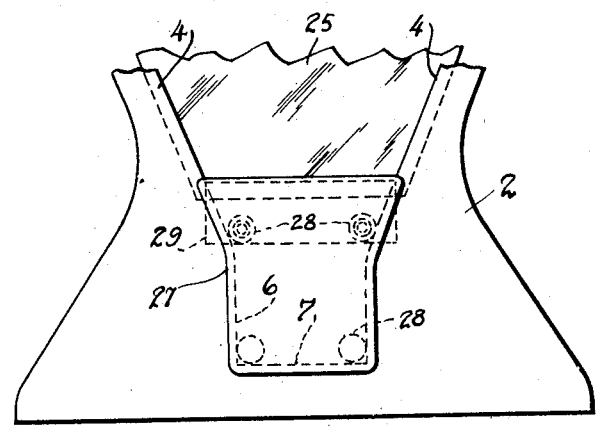
Fig. 7
Fig. 8
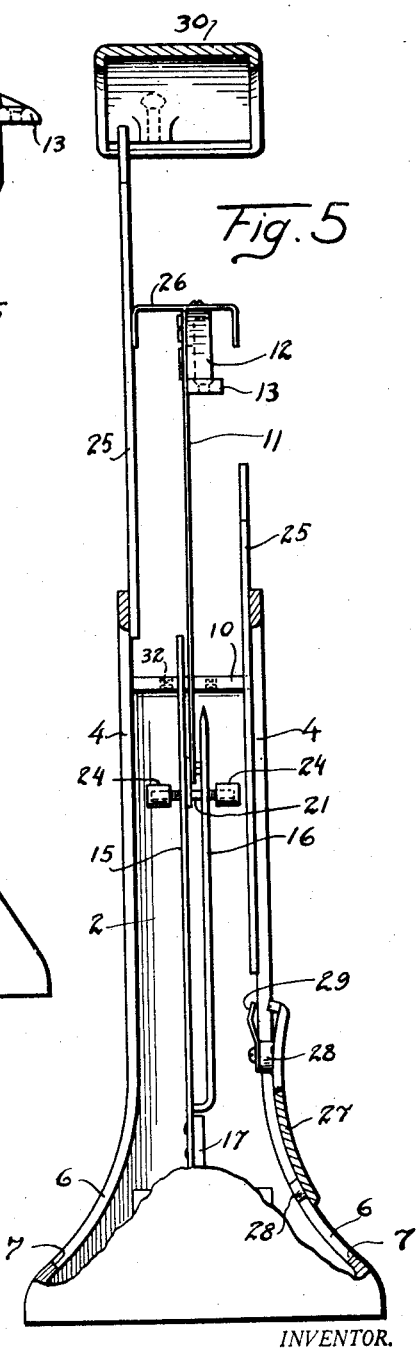
INVENTOR.
Bert W. King
BY
ATTORNEY.

Patented Jan. 19, 1932

1,842,029

UNITED STATES PATENT OFFICE

BERT W. KING, OF DETROIT, MICHIGAN, ASSIGNOR TO BARNES SCALE COMPANY, OF DETROIT, MICHIGAN, A CORPORATION OF MICHIGAN

SCALE CONSTRUCTION

Application filed June 13, 1929. Serial No. 370,506.

This invention relates to a scale construction and it has to do particularly with a scale of the so-called fan type wherein there is an indicator or pointer, which moves across a chart, roughly of fan shape, with indicia thereon generally concentric with the fulcrum point or the moving indicator.

This invention aims to provide a housing for this chart, indicator, and other associated parts which embodies a number of improvements in construction over housings of this character. One object of the invention is the provision of a scale housing, and assembly embodying a chart and transparent closures therefor, wherein the parts may be very quickly assembled or disassembled. Another object is to provide a housing and associated assembly parts wherein the chart is substantially equally visible from either side thereof, so that a customer on one side of the scale can watch the pointer or indicator and chart as well as the merchant or the like, operating the scale from the opposite side. In this regard, the arrangement is such that light on one side of the scale may pass through the housing to render visible the indicia on the opposite side of the chart.

Moreover, the invention contemplates a construction wherein both the faces of the fan-shaped housing are of uniform construction. Heretofore, such housings of fan shape have had an open face on one side and the assembly made through the open face, whereupon a flange or rim was secured to the housing, while the other side had no flange or rim. In the present instance, the arrangement is such that the several parts within the housing are placed therein through the top, and the housing is eventually closed by a cap or top closure member, as distinguished from the flange or rim around one side of the face of the housing.

Fig. 1 is an elevation of a scale construction in accordance with the invention, with some parts cut away and some in section, in order to depict the structural features thereof.

Fig. 2 is a sectional view taken on line 2—2 of Fig. 1, illustrating the double indicator and transparent closures, one on each side of the housing.

Fig. 3 is an enlarged detail taken substantially on line 3—3 of Fig. 1.

Fig. 4 is a top plan with part of the top closure member, or cap, cut away to illustrate some of the interior structural parts.

Fig. 5 is a vertical section taken through the housing and illustrating the manner of assembly, showing how the parts are assembled through the top of the fan-shaped housing.

Fig. 6 is a side elevation of a chart.

Fig. 7 is a view illustrating the manner in which transparent closure members are held in place.

Fig. 8 is a detail view of one of the holding devices for a transparent closure member.

The construction of this invention may be utilized on a fan scale of any of the several types, and as shown herein, there is a vertical post or upright 1, rising from the scale platform (not shown). A fan-shaped housing generally referenced 2 is secured to the top of the post 1. For this purpose, the housing rests upon the top of the post, as depicted in Fig. 2, and the post and housing have lugs which align with each other and through which machine screws 3 may be taken.

This fan-shaped housing is preferably of a one-piece construction, such as a casting. In the present instance, the walls of the housing, as they rise from the post 1, converge inwardly toward each other for a distance and then diverge from each other so that the housing in the main takes the shape of a fan. It is not essential that the walls first converge toward each other, although the particular housing elected for disclosure herein is so arranged. The fan-shaped faces each has a fan-shaped opening therein, as clearly shown in Fig. 1, and the openings are bounded by inwardly projecting flanges 4. The shape of the edge walls and flanges of the housing is illustrated in Fig. 3, wherein the edge wall is referenced 5. Accordingly, it will be observed that both sides of the fan-shaped casing, and both flanges 4 are identical, thus to form a uniformly shaped construction. It will be noted that the flanges 4, bounding the openings, terminate at their lower portions in substantially parallel wall portions 6 with the bottom as at 7, and the purpose of this construction will later be brought out.

The top of this fan-shaped housing is open and the walls are preferably provided with inwardly extending ledges or flanges 10, for supporting certain parts of the assembly. The chart 11, as shown in Fig. 6, is placed in this housing through the upper open end. This chart is secured to a suspension member 12, which may be of angular construction, as shown in Fig. 2, and which has end extensions 13. These end extensions rest upon the ledges 10. For securing the extensions to the ledges, the extensions may be provided with suitable apertures as shown, and the ledges 10 with screw-threaded apertures for the reception of suitable machine screws as shown at 14. The chart, accordingly, hangs suspended within the fan-shaped housing with its lower end freely disposed in the housing. The chart is preferably disposed substantially centrally of the transverse dimensions of the housing. The scale mechanism preferably has two pointers, or indicators, one as shown at 15 and the other as at 16. The chart is disposed between them. These indicators are secured to any conventional scale mechanism such as a member 17 which rocks upon a knife edge bearing 18, when weight is applied to the platform (not shown) and communicated thereto through the means of a ribbon 19. The usual balance weight is shown at 20.

It is desirable to have a support for the lower end of the chart, and for this purpose, a screw-threaded member 21 is provided (Fig. 3), which is secured to the chart as by means of a bracket 22 and bolt 23. Each end of the member 21 is screw-threaded, and each has thereon an adjusting nut 24. These adjusting nuts are retracted upon the bolt member 21 when the chart is assembled or placed within the housing, and then the nuts 24 may be turned on the screw-threads so that they move outwardly and engage the interior walls of the flanges 4. By making proper adjustments, the chart can be adjusted as to its position and held in such position.

The manner in which the chart is placed within the housing is depicted in Fig. 5, wherein the chart is shown as being partly within the housing. Suitable transparent closure members are used to close the openings at the opposite faces of the fan-shaped housing. These closure members preferably being glass panels 25. The glass panels are of a shape which corresponds to the shape of the housing and are placed in the housing by insertion through the top thereof, as illustrated in Fig. 5. The upper ends are spaced apart by means of a suitable spacing element which may be in the form of a channel-shaped member 26, carried by the suspension member 12 for the chart.

The lower ends of the glass panels may be held in place by removable clip members 27. The body portions of these clip members 27 are such as to generally correspond to the shape of and close the lower portion of the openings defined by the walls 6 and 7. The clips have suitable projections 28, and also carry a casing engaging member 29. In securing a clip to the housing, the same is placed in proper position as regards the housing at a sufficient height from the lower wall 7 of the opening of the housing as to permit the clip member 29 to pass through the opening, whereupon the clip member is urged downwardly until the lugs, or projections, 28 come into contact with the wall 7. At this time, the housing engaging member 29 locks behind the adjacent portions of the flanges 4 (Fig. 1). The lower edges of the glass panels are received by the engaging members 29 and rest thereon, these members being properly shaped in cross section for this purpose, as illustrated in Fig. 2.

A closure member is provided for the upper end of the housing, and it may be in the form of a cap 30 which fits over the upper end of the housing. It may be secured in place by means of machine screws taken therethrough, such screws being shown at 31, and threaded into screw-threaded openings 32 in the ledges 10.

The assembly of the parts within the housing can be very quickly made, or the parts can be very quickly removed for any adjustment or repair purposes. In making the assembly, it is preferable to first place the chart in position, the glass panels being not yet in place, so that an operator may adjust the transverse supporting member for the lower edge of the chart. The glass panel supporting clips 27 may now be snapped into place, and then the panels inserted through the top of the housing, after the manner illustrated in Fig. 5, whereupon the top closure or cap is secured in place. The parts of course, may be easily removed by a reversal of this procedure.

It is to be noted that the chart is of such a size that its diverging edges 35 are spaced from the side walls 5 of the housing, thus to provide a space 36. Also the chart is preferably positioned substantially centrally as regards the transverse dimension of the housing. The chart is substantially equally visible from either side of the housing through the respective glass panels. In the event that the majority of the illuminating light comes from one side of the housing, a certain amount of light is permitted to pass through the openings 36 in such a manner as to adequately illuminate, or to make adequately visible the opposite side of the chart. In scales heretofore known, it oftimes was the case that one side of the chart, usually that of the customer, was not sufficiently visible, except by artificial light. With this invention, artificial light is not requisite, although it may be provided if desirable. Of course, the light coming from one side of the scale does not pass directly through spaces 36, inasmuch as such spaces are covered by flanges 4, but a sufficient amount of light is reflected in such a manner as to adequately light up the opposite face of the chart.

Claims:

1. In a scale, a fan-shaped housing for a scale indicator comprising a one-piece member of fan shape positioned uprightly and having an open top, said housing having at least one open face, an indicating chart insertable through the open top of the housing, a glass panel insertable through the said open top for covering the open face of the housing, and means for holding the chart and glass panel in place.

2. In a scale, a fan-shaped housing for a scale indicator positioned uprightly and having an open top, said housing having its opposite faces open, a chart insertable through the open top over which the indicator moves, a pair of glass panels also insertable through the open top for closing the open faces of the housing, and means for holding the glass panels in place.

3. In a scale, a fan-shaped housing for a scale indicator positioned uprightly and having an open top, said housing having its opposite faces open, a chart insertable through the open top over which the indicator moves, a pair of glass panels also insertable through the open top for closing the open faces of the housing, means for holding the glass panels in place, and a closure member for the open top of the fan-shaped housing.

4. In a scale, an uprightly positioned fan-shaped housing having an open top and open sides, a chart insertable through the open top of the housing, means from which the chart is suspended secured near the open end of the housing, a pair of glass panels insertable through the open top for closing the opposite open faces of the housing, means for supporting the lower edges of the glass panels, and a spacer for the upper edges of the glass panels.

5. In a scale, an uprightly positioned fan-shaped housing having an open top and open sides, a chart insertable through the open top of the housing, means from which the chart is suspended secured near the open end of the housing, a pair of glass panels insertable through the open top for closing the opposite open faces of the housing, means for supporting the lower edges of the glass panels, a spacer for the upper edges of the glass panels, said spacer comprising a member supported by the suspension member for the chart.

6. In a scale, an uprightly positioned fan-shaped housing having an open top and having its opposite faces open, a scale indicator in the housing comprising two spaced indicating parts, a chart insertable through the open top of the housing and positioned between the two spaced indicator parts, and means for centralizing the chart as regards the housing and the two indicator parts.

7. In a scale, an uprightly positioned fan-shaped housing having an open top and having its opposite faces open, a scale indicator in the housing comprising two spaced indicating parts, a chart insertable through the open top of the housing and positioned between the two spaced indicator parts, means for holding the chart in suspension from the top of the housing, and means for supporting the lower edge of the chart and for centralizing the same as regards the housing and the two spaced indicator parts.

8. In a scale, an uprightly positioned fan-shaped housing having an open top and having its opposite faces open, a scale indicator in the housing comprising two spaced indicating parts, a chart insertable through the open top of the housing and positioned between the two spaced indicator parts, means for holding the chart suspended between the said indicating parts, a pair of glass panels insertable through the open top of the housing for closing the said opposite open faces, and a closure member for the top of said housing.

9. In a scale, an uprightly positioned fan-shaped housing having an open top and having its opposite faces open, a scale indicator in the housing comprising two spaced indicating parts, a chart insertable through the open top of the housing and positioned between the two spaced indicator parts, a pair of glass panels in the housing for closing the opposite faces thereof, said chart having dimensions such that its edge portions are spaced from the edge walls of the fan-shaped housing, whereby to permit passage of light around said chart from one side of the housing to the other to render visible the face of the chart and the indicator member from each side of the housing.

10. In a scale, an uprightly positioned fan-shaped housing having an open top and having its opposite faces open, a scale indicator in the housing having two spaced indicating members, a chart insertable through the upper open end of the housing and positioned between the indicating parts, a pair of glass panels insertable through the top of the housing for closing the opposite open faces thereof, and removable clip members for supporting the glass panels at their lower edge.

11. In a scale, an uprightly positioned fan-shaped housing having an open top and having its opposite faces open, a scale indicator in the housing having two spaced indicating members, a chart insertable through the upper open end of the housing and positioned between the indicating parts, a pair of glass panels insertable through the top of the housing for closing the opposite open faces thereof, and removable clip members for supporting the glass panels at their lower edge, said removable clip members being detachably secured to the housing by a member engaging the inside of the walls adjacent the open face.

12. In a scale, an uprightly positioned fan-shaped housing having an open top and having its opposite faces open, a scale indicator in the housing having two spaced indicating members, a chart insertable through the upper open end of the housing and positioned between the indicating parts, a pair of glass panels insertable through the top of the housing for closing the opposite open faces thereof, removable clip members for supporting the glass panels at their lower edge, said removable clip members being detachably secured to the housing by a member engaging the inside of the walls adjacent the open face, means for spacing the glass panels apart at their upper edges, and a cap member for closing the open top end of the housing.

In testimony whereof I affix my signature.

BERT W. KING.